No. 833,397. PATENTED OCT. 16, 1906.
F. J. LANCASTER.
VEHICLE WHEEL.
APPLICATION FILED OCT. 23, 1905.
2 SHEETS—SHEET 1.
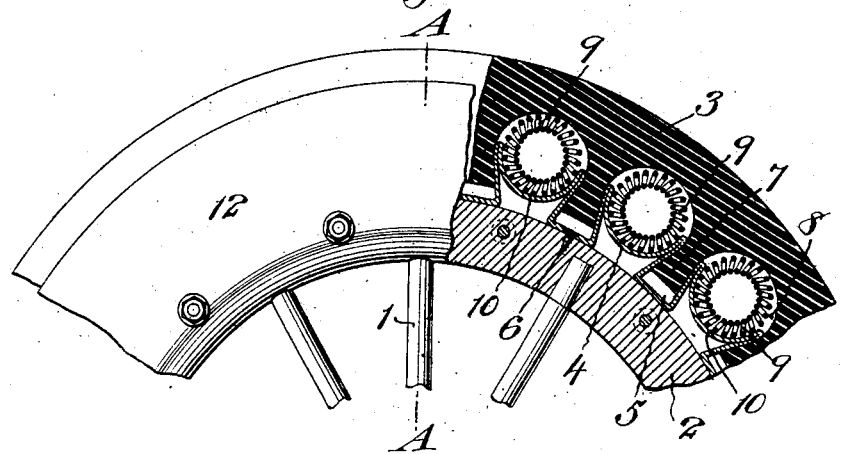
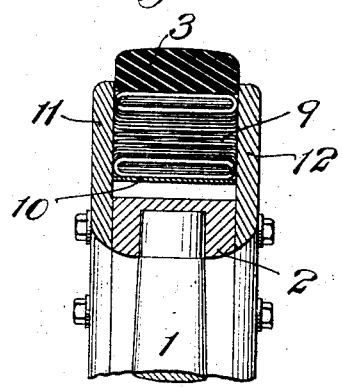
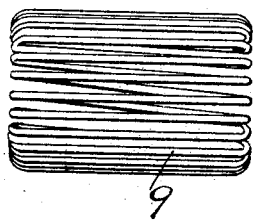
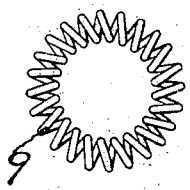
Witnesses:
F. George Barry,
Henry Thiene.
Inventor:
Frederick J. Lancaster
by attorneys No. 833,397. PATENTED OCT. 16, 1906.
F. J. LANCASTER.
VEHICLE WHEEL.
APPLICATION FILED OCT. 23, 1905.

2 SHEETS—SHEET 2.

Witnesses:-
F. George Barry.
Henry Thieme.

Inventor:-
Frederick J. Lancaster
by attorneys

UNITED STATES PATENT OFFICE.

FREDERICK J. LANCASTER, OF NEW YORK, N. Y.

VEHICLE-WHEEL.

No. 833,397.   Specification of Letters Patent.   Patented Oct. 16, 1906.

Application filed October 23, 1905. Serial No. 283,997.

*To all whom it may concern:*

Be it known that I, FREDERICK J. LANCASTER, a citizen of the United States, and a resident of the borough of Manhattan, in the city and State of New York, have invented a new and useful Improvement in Vehicle-Wheels, of which the following is a specification.

The object of this present invention is to provide certain improvements in vehicle-wheels; and it consists in a vehicle-wheel in which a tire of yielding material, such as rubber compound or analogous material, is locked to the felly against longitudinal movement thereon and springs interposed between the felly and tire for permitting a local yielding of the tire at any point without affecting the tire at other points around the felly.

Figure 5:
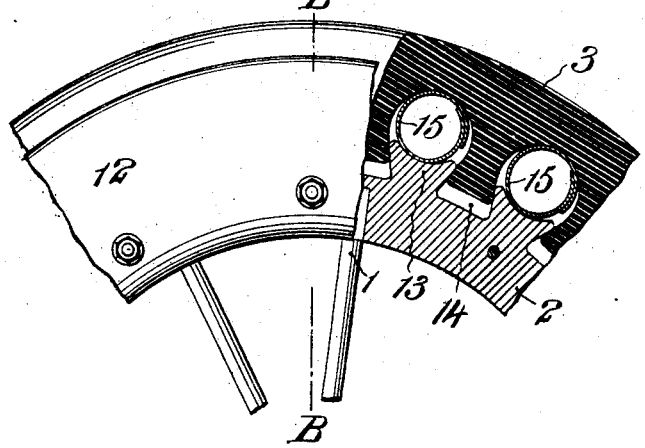
Figure 6:
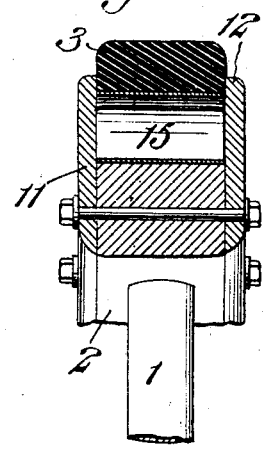
Figure 7:
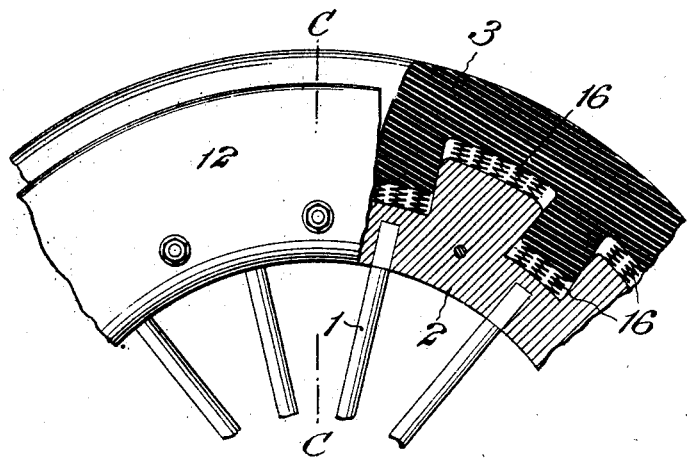
Figure 8:
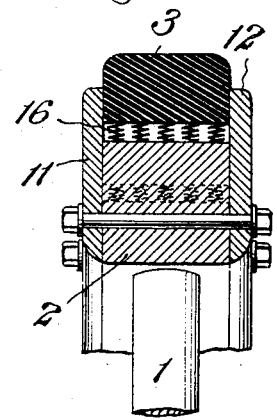

In the accompanying drawings, Figure 1 represents in side elevation, partly in longitudinal central section, a portion of a vehicle-wheel, illustrating one embodiment of my invention. Fig. 2 is a cross-sectional view taken in the plane of the line A A of Fig. 1. Fig. 3 is a view in side elevation of the novel form of spring which is interposed between the felly and tire. Fig. 4 is an end view of the said spring. Fig. 5 represents in side elevation, partially in longitudinal central section, a portion of a vehicle-wheel, illustrating a second embodiment of my invention. Fig. 6 is a cross-sectional view taken in the plane of the line B B of Fig. 5. Fig. 7 represents in side elevation, partially in longitudinal central section, a portion of a vehicle-wheel, illustrating a third embodiment of my invention; and Fig. 8 is a cross-sectional view taken in the plane of the line C C of Fig. 7.

The spokes of the vehicle-wheel are denoted by 1, and the felly by 2.

The tire is denoted by 3, which tire is of yielding material, such as rubber compound or analogous material, and is unattached to any metallic band or its equivalent which would tend to impede the free local yielding of the tire on its cushioning devices.

In the form shown in Figs. 1 to 4, inclusive, the felly is provided with annular series of alternating outwardly-extending projections 4 and recesses 5, formed by bending a band of metal or other suitable material into the proper shape and securing said band to the outer face of the felly, as shown at 6. The tire is provided with annular series of alternating inwardly-extending projections 7 and recesses 8, arranged to permit the tire to be interlocked with the felly for preventing the tire from moving longitudinally thereon. Springs 9 are interposed between the felly and tire for permitting a local yielding movement of the tire without affecting the other portions of the tire, which springs have their axes substantially parallel with the axis of the wheel-felly. These springs are located within the recesses 8 in the tire and rest in seats 10 in the outer faces of the outwardly-extending projections 4 of the felly. Each of these springs 9 comprises an annular series of longitudinally-flattened coils. The ends of the coils are rounded, as shown, so as to prevent any tendency of the springs to chafe or bind the rubber. The springs constructed in the form herein shown permit the tire and felly to have an extended bearing thereon and yet at the same time will permit a ready local yielding of the tire without a frictional sliding movement between the tire and spring. The tire and springs are held in position against lateral displacement by providing the felly 2 with side plates 11 and 12, which project outwardly a sufficient distance to overlap the ends of the springs and a portion of the body of the tire.

In the form shown in Fig. 5 the felly projections 13 are shown as a part of the felly itself, and the recesses 14, alternating with the projections, are shown as being formed in the felly. In this form coil-springs 15 are shown as interposed between the tire and felly, these springs also having their axes substantially parallel with the axis of the wheel-felly.

In Fig. 7 a form is shown in which a plurality of small coil-springs 16 are located in both the felly-recesses and the tire-recesses for permitting a local yielding of the tire on the felly, the tire at the same time being locked against longitudinal movement on the felly, as in the other forms.

What I claim is—

1. The combination with a wheel-felly and a tire of yielding material locked against longitudinal movement thereon, of a plurality of independent springs interposed between the felly and tire having their axes substantially parallel with the axis of the wheel-felly, each of said springs comprising an annular series of coils.

2. The combination with a wheel-felly and a tire of yielding material locked against longitudinal movement thereon, of springs interposed between the felly and tire and arranged with their axes substantially parallel with the axis of the wheel-felly, each of said springs comprising an annular series of longitudinally-flattened coils.

3. The combination with a wheel-felly and a tire of yielding material locked against longitudinal movement thereon, of springs interposed between the felly and tire and arranged with their axes substantially parallel with the axis of the wheel-felly, each of said springs comprising an annular series of longitudinally-flattened coils having rounded ends.

4. The combination with a wheel-felly and a tire of yielding material having inwardly-extending projections engaging the felly for locking the tire against longitudinal movement thereon, of springs interposed between the felly and tire.

5. The combination with a wheel-felly and a tire of yielding material, said felly having outwardly-extending projections engaging the tire for locking it against longitudinal movement thereon, of springs interposed between the felly and tire.

6. The combination with a wheel-felly having annular series of outwardly-extending projections and a tire of yielding material having annular series of inwardly-extending projections interlocking with the felly projections for locking the tire against longitudinal movement on the felly and springs interposed between the felly and tire.

7. The combination with a wheel-felly having annular series of projections and recesses and a tire of yielding material having annular series of projections and recesses alternating with the projections and recesses on the felly, of springs interposed between the felly and tire and located in said tire-recesses, the said felly projections having seats for receiving the springs.

8. The combination with a vehicle-wheel felly having projections and recesses and a tire of yielding material having projections and recesses, of springs interposed between the felly and tire and located in the recesses in the tire and bearing against the outer faces of the felly projections.

9. The combination with a wheel-felly, a band bent to form annular series of projections and recesses, a tire of yielding material having annular series of projections and recesses alternating with the projections and recesses on the wheel-felly band, of springs interposed between the felly and tire located in the tire-recesses and bearing against the outer faces of the felly projections.

10. The combination with a wheel-felly and a tire of yielding material having interlocking projections for locking the tire against longitudinal movement on the felly, of springs interposed between the felly and tire and side plates for retaining the springs in position and retaining the tire against lateral displacement.

In testimony that I claim the foregoing as my invention I have signed my name, in presence of two witnesses, this 16th day of October, 1905.

FREDERICK J. LANCASTER.

Witnesses:
FREDK. HAYNES,
F. GEORGE BARRY.